United States Patent [19]

Bryant

[11] Patent Number: 5,114,046

[45] Date of Patent: May 19, 1992

[54] ABOVE GROUND FUEL STORAGE AND DISPENSING APPARATUS

[75] Inventor: Billy O. Bryant, 3300 Niles St., Bakersfield, Calif. 93306

[73] Assignee: Billy O. Bryant, Calif.

[21] Appl. No.: 589,986

[22] Filed: Sep. 28, 1990

[51] Int. Cl.⁵ .............................................. B65D 88/06
[52] U.S. Cl. .................................. 222/108; 137/234.6; 137/312; 220/571; 222/173
[58] Field of Search ............... 222/108, 129, 608, 173, 222/14, 131, 183; 220/571, 85 S, 445; 141/86; 137/234.6, 312, 264, 343, 356, 363, 375–378

[56] References Cited

U.S. PATENT DOCUMENTS

| | | | |
|---|---|---|---|
| 2,944,563 | 7/1960 | Blasio et al. | 137/312 |
| 3,366,280 | 1/1968 | Sampson et al. | 222/173 |
| 4,960,222 | 10/1990 | Fields, III | 220/571 X |
| 4,986,446 | 1/1991 | Montgomery et al. | 222/173 X |
| 4,988,020 | 1/1991 | Webb | 222/608 |

FOREIGN PATENT DOCUMENTS 2209183  5/1989  United Kingdom ............... 220/571

Primary Examiner—Kevin P. Shaver
Attorney, Agent, or Firm—Lyon & Lyon

[57] ABSTRACT

An above ground fuel storage and dispensing apparatus that is self contained and includes a support frame on which a fuel storage tank is mounted and surrounded by a fuel containment vessel formed by side walls and a bottom of the support frame for containing any fuel that may leak from the tank or fittings and pipe extending from the tank. One corner of the support frame has the vertical side walls recessed to form a recessed compartment for the fuel dispensing pump and electrical equipment which are thereby protected by the frame and side walls from being damaged by vehicles or the like operated in the vicinity.

5 Claims, 2 Drawing Sheets

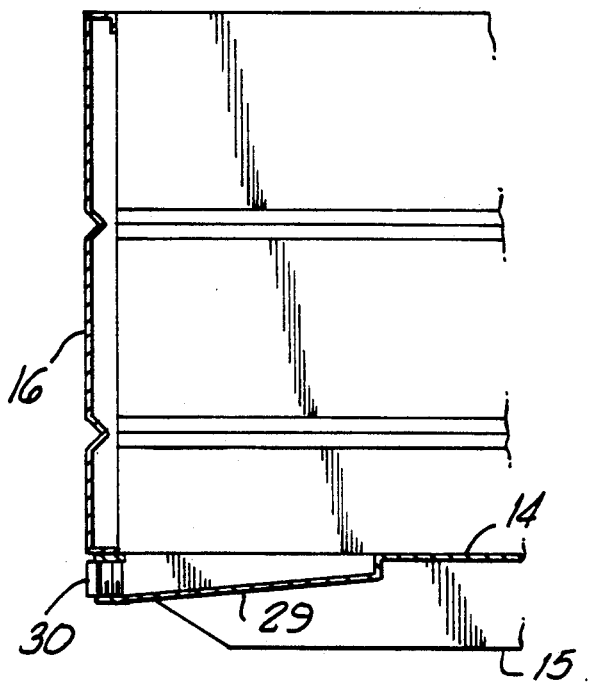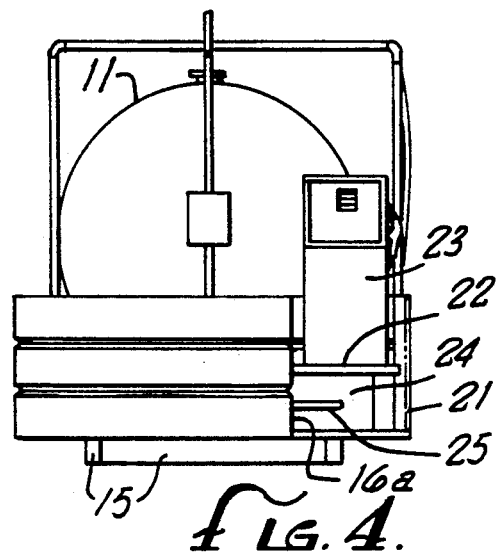
fig.5.
fig.4.

ABOVE GROUND FUEL STORAGE AND DISPENSING APPARATUS

This invention relates to an apparatus for storing and dispensing fuel to vehicles and, in particular, to an apparatus of this type that is self contained and positioned above ground whereby it may be conveniently located and relocated as desired.

Fuel burning vehicles such as automobiles, trucks, boats, airplanes and the like require periodic refueling from a large fuel storage tank. Heretofore, it has been conventional to bury such fuel storage tanks under ground and to pump the fuel to the vehicle but such underground tanks are subject to deterioration and eventual failure leading to fuel contamination of the surrounding ground and underground water supplies. As a result of environmental concerns, now there are substantial requirements and restrictions for underground fuel storage tanks significantly increasing the cost thereof. Moreover, an underground fuel storage tank is a very permanent installation which cannot be moved from location to location without considerable difficulty, expense and time.

Thus, it has become increasingly more popular to provide above ground fuel storage tanks that are not subject to the same restrictions and regulations and can be readily moved to new locations as desired. For even greater flexibility and mobility of such above ground fuel storage systems, they are often provided with the fuel dispensing equipment mounted on the same frame as the fuel tank whereby the entire assembly can be moved. Such fuel systems are usually provided with a containment vessel formed around the tank to receive and contain any fuel that may leak from the tank and the fuel dispensing equipment is mounted externally of the containment vessel. However, it has been found that the fuel dispensing equipment including expensive pumps and gauges are often damaged by the improper operation of vehicles being refueled and by equipment used in moving the fuel storage and dispensing system.

It is an object of the present invention to provide an improved above ground fuel storage and dispensing apparatus that has all of the advantages of such apparatus but prevents or at least substantially inhibits damage to the fuel dispensing equipment.

A further object of the present invention is to provide an above ground fuel storage and dispensing apparatus wherein the fuel storage tank is positioned within a fuel containment vessel formed as part of a support frame for the entire apparatus in which a portion of the fuel containment vessel is recessed from the perimeter of the support frame for accommodating the fuel dispensing equipment in a compartment protected from both fuel tank leakage and external damage by vehicles and the like.

Further and more detailed objects and advantages of this invention will appear from the following description of a preferred embodiment and the accompanying drawings, in which:

FIG. 4 is an end elevation view of the apparatus of FIG. 1; and

FIG. 5 is an enlarged, fragmentary sectional elevation of the apparatus taken substantially on the Line V—V of FIG. 2.

Figure 1:
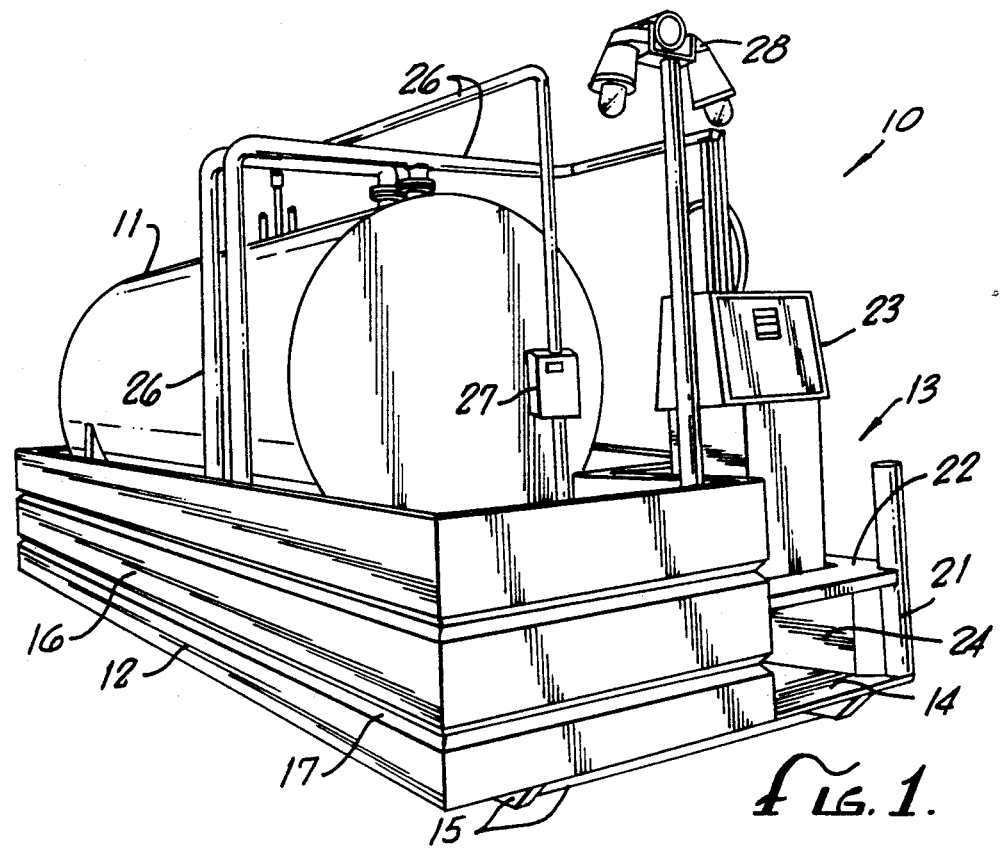
FIG. 1 is a perspective view of the above ground fuel storage and dispensing apparatus of this invention.

The above ground fuel storage and dispensing apparatus of this invention is generally designated 10 and includes a fuel storage tank 11, a support frame 12 on which the fuel tank 11 is mounted, and fuel dispensing equipment, generally designated 13. The support frame 12 is preferably rectangular, as shown in the top plan view FIG. 2, because the most common and efficient shape for a fuel tank is an elongated cylinder, such as fuel tank 11 shown in the drawings. However, for specific applications, the support frame may be square or some other convenient shape having plural sides but for convenience it will be referred to herein as being rectangular.

The rectangular support frame 12 has a bottom 14 supported on beams 15 adapted to rest on the ground and vertical side walls 16 around the entire perimeter of the frame 12. The side walls 16 are joined to the bottom 14 in a fuel-tight manner for forming a containment vessel of sufficient size to contain all of the fuel in tank 11 if tank 11 or the connecting pipes develop a leak to thereby safely contain the leaking fuel. The vertical sides 16 may be reinforced, such as by the ribs 17 to strengthen the entire support frame 12 and adequately contain the leaked fuel without bulging. The volume of the containment vessel formed by the bottom 14 and sides 16 is larger than the volume of the tank, even considering the pipes and structure within the containment vessel, whereby any leak in the tank will not result in the fuel overflowing the containment vessel even from a full fuel tank 11.

Figure 2:
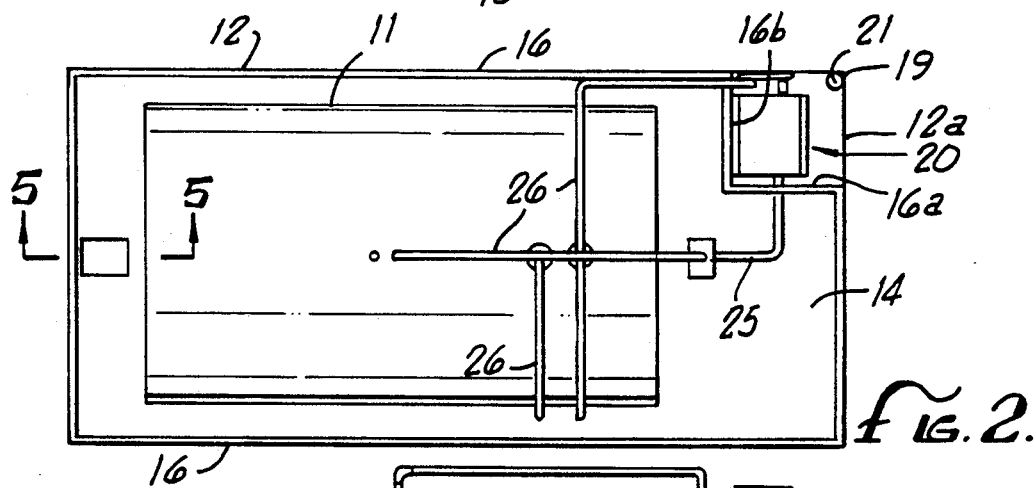
FIG. 2 is a top plan view of the apparatus of FIG. 1.
Figure 3:
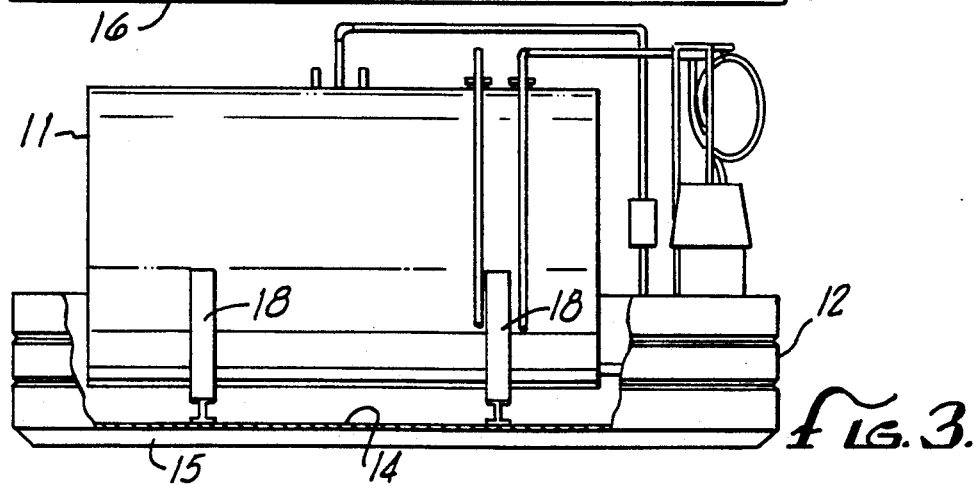
FIG. 3 is a side elevation view with portions broken away of the apparatus of FIG. 1.

The fuel tank 11 is mounted on the bottom 14 of the support frame 12 by conventional supports 18. As best shown in FIG. 2, the fuel tank 11 is of a size and is positioned on the support frame 12 such that the fuel tank 11 is within the side walls 16, that is, no portion of the tank 11 projects horizontally beyond the side walls, whereby the fuel storage tank 11 is protected from approaching vehicles by the sides 16 of the support frame 12.

At one corner 19 of the support frame 12, the vertical sides 16a and 16b are recessed from the outer perimeter 12a of the support frame to form a recessed compartment, generally designated 20, of the full height of the side wall 16 above the bottom 14. A vertical post 21 is mounted on the bottom 14 at the corner 19 and preferably is of extremely sturdy construction to withstand impacts from vehicles operated in the vicinity. A horizontal platform 22 is mounted in the compartment 20 in spaced relationship above the bottom 14. The fuel dispensing apparatus is mounted in the reset compartment 20 and may include a conventional service station type fuel dispenser 23 mounted on the platform 22 with all of the electrical components 24 mounted beneath the platform 22. A fuel line 25 from fuel tank 11 extends through the side wall 16a in fuel-tight relationship into the recessed compartment 20 below the platform 22 for connection to the fuel dispensing apparatus. By this arrangement, the fuel dispenser 23 and electrical components 24 are all positioned within the recessed compartment 20 and nothing extends beyond the horizontal extent of the support frame 12 and specifically the principle vertical side walls 16 and post 21, whereby such equipment is fully protected from vehicles operated in the vicinity and equipment used for moving the fuel storage and dispensing apparatus 10.

The fuel storage and dispensing apparatus 10 requires a variety of piping 26, meters 27, light poles 28 and similar devices, the functions of which are not relevant to this invention, and, as shown in FIG. 2, all of such devices are positioned within the side walls 16 and the vertical extensions thereof whereby such devices are protected from vehicles operated in the vicinity. The containment vessel formed by the bottom 14 and sides 16 of the frame 12 includes a drain box 29 with a drain plug or fitting 30 mounted in the bottom 14 between beams 15 and horizontally within the side walls 16 whereby the drain box and fitting also are fully protected from vehicles operating in the vicinity.

When the fuel storage and dispensing apparatus 10 is to be used in a facility for refueling vehicles that do not require the information and user convenience of a standard fuel dispenser 23, such as a fuel storage and dispensing apparatus at an airport for refueling airplanes, the fuel dispenser 23 may be replaced with a simple hose extending from a pump located either with the electrical components 24 beneath the platform 22 in the recessed compartment 20 or inside the containment vessel at the right-hand end of tank 11, as viewed in FIG. 2. Further, while the preferred embodiment of this invention has the recessed compartment 20 located at a corner of the support frame 12, it will readily appear to those skilled in the art that the recessed compartment may also be located elsewhere along the sides of the frame, such as in the middle of one end of the frame whereby the equipment located in the compartment will still be protected from vehicles operated in the vicinity.

Thus, it may be seen from the foregoing description and the accompanying drawings that by this invention there is provided a self-contained above ground fuel storage and dispensing apparatus that includes a support frame forming a fuel containment vessel for accommodating any leakage from the fuel tank mounted inside the vessel and the fuel dispensing apparatus is fully protected from damage by being positioned in a recessed compartment within the perimeter of the frame. While a specific embodiment of this invention has been shown in the drawings and described in connection therewith, it will readily appear to those skilled in the art that various modifications of such embodiment can be made without departing from the invention as defined by the following claims.

I claim:

1. An above ground fuel storage and dispensing apparatus, comprising, a rectangular support frame having an outer perimeter, said frame including vertical side walls around the perimeter and a bottom forming an open-top containment vessel, a fuel tank having a predetermined volume mounted on said frame within said side walls and bottom, said containment vessel having a volume larger than said volume of the fuel tank for containing all the fuel from the fuel tank in the event of a fuel tank leak, said fuel tank having a horizontal perimeter formed by the maximum horizontal dimensions of the fuel tank, said vertical side walls of the frame being spaced outwardly from the horizontal perimeters of the fuel tank in all horizontal directions and being of a sufficient size and strength for protecting the fuel tank from horizontal external impacts by vehicles and the like against the vertical side walls of the apparatus, portions of said vertical side walls recessed from a maximum horizontal extent of the perimeter of the support frame for forming a recessed compartment outside of the containment vessel and open outwardly toward the perimeter, a fuel line connected to said tank and extending through said portions of said vertical side walls into said recessed compartment, and means for dispensing fuel mounted in said recessed compartment within said frame perimeter and connected to said fuel line.

2. The apparatus of claim 1, wherein said means for dispensing fuel includes electrical components mounted in a said recessed compartment.

3. The apparatus of claim 1, wherein said recessed compartment is formed at a corner of said rectangular support frame, a platform mounted in said recessed compartment above said bottom of the frame, and a vertical post is mounted at said corner for protecting said recessed compartment.

4. The apparatus of claim 3, wherein said means for dispensing fuel includes a dispensing pump mounted on said platform.

5. The apparatus of claim 4, wherein said means for dispensing fuel includes electrical components mounted below said platform in said compartment.

* * * * *